(12) United States Patent
Goss et al.

(10) Patent No.: US 7,594,760 B2
(45) Date of Patent: Sep. 29, 2009

(54) BEARING CUP ROTATIONAL LOCK ASSEMBLY

(75) Inventors: James D Goss, Burbank, CA (US); John M Fabry, Simi Valley, CA (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 308 days.

(21) Appl. No.: 10/662,751

(22) Filed: Sep. 15, 2003

(65) Prior Publication Data

US 2005/0058378 A1 Mar. 17, 2005

(51) Int. Cl.
  *F16C 33/66* (2006.01)
  *F16C 27/00* (2006.01)
  *F16C 33/60* (2006.01)
(52) U.S. Cl. .............. 384/517; 384/535; 384/536; 384/500
(58) Field of Classification Search .......... 384/500, 384/517, 519, 535, 536, 537, 504, 505, 502, 384/501, 512, 99, 906, 905, 557, 493, 518, 384/563; 267/161, 162
See application file for complete search history.

(56) References Cited

U.S. PATENT DOCUMENTS

| | | | | |
|---|---|---|---|---|
| 1,325,910 A | * | 12/1919 | Reynolds | 384/504 |
| 1,326,892 A | * | 12/1919 | Reynolds | 384/495 |
| 1,386,255 A | * | 8/1921 | Hindle et al. | 384/535 |
| 1,399,959 A | * | 12/1921 | Hanson | 384/517 |
| 1,851,561 A | * | 3/1932 | Baninger | 384/536 |
| 3,516,717 A | * | 6/1970 | Peterson | 384/517 |
| 4,043,546 A | * | 8/1977 | Ashfield et al. | 267/162 |
| 4,618,272 A | * | 10/1986 | Lindstrom | 384/517 |
| 4,652,219 A | * | 3/1987 | McEachern et al. | 417/407 |
| 5,044,789 A | * | 9/1991 | Damon et al. | 384/581 |
| 5,403,165 A | | 4/1995 | Lehe et al. | |
| 5,624,193 A | * | 4/1997 | Vogelsberger et al. | 384/517 |
| 6,270,260 B1 | * | 8/2001 | Hale | 384/537 |

\* cited by examiner

*Primary Examiner*—Thomas R Hannon
*Assistant Examiner*—Justin Krause
(74) *Attorney, Agent, or Firm*—Carlson, Gaskey & Olds PC

(57) ABSTRACT

A bearing cup having a ring and a shoulder extending radially inward from an inner surface of the ring. At least one tang extends axially outward from a first side of the ring. At least one tab extends axially outward from a second side of the ring opposite the first side. And, at least one slot is formed in the second side. The bearing cup prevents the outer race of a conventional rolling element bearing from rotating while allowing the bearing to move in an axial direction. The assembly is designed for use with either a single rolling element bearing or a set of two bearing assemblies or any number of closely spaced bearings. The advantage of the device is that it eliminates spinning of the bearing assembly outer race. The device also prevents frictional sliding between a bearing assembly outer race and a preload spring. Frictional sliding imposed on a bearing outer race can induce galling and subsequently lead to part failure.

28 Claims, 5 Drawing Sheets

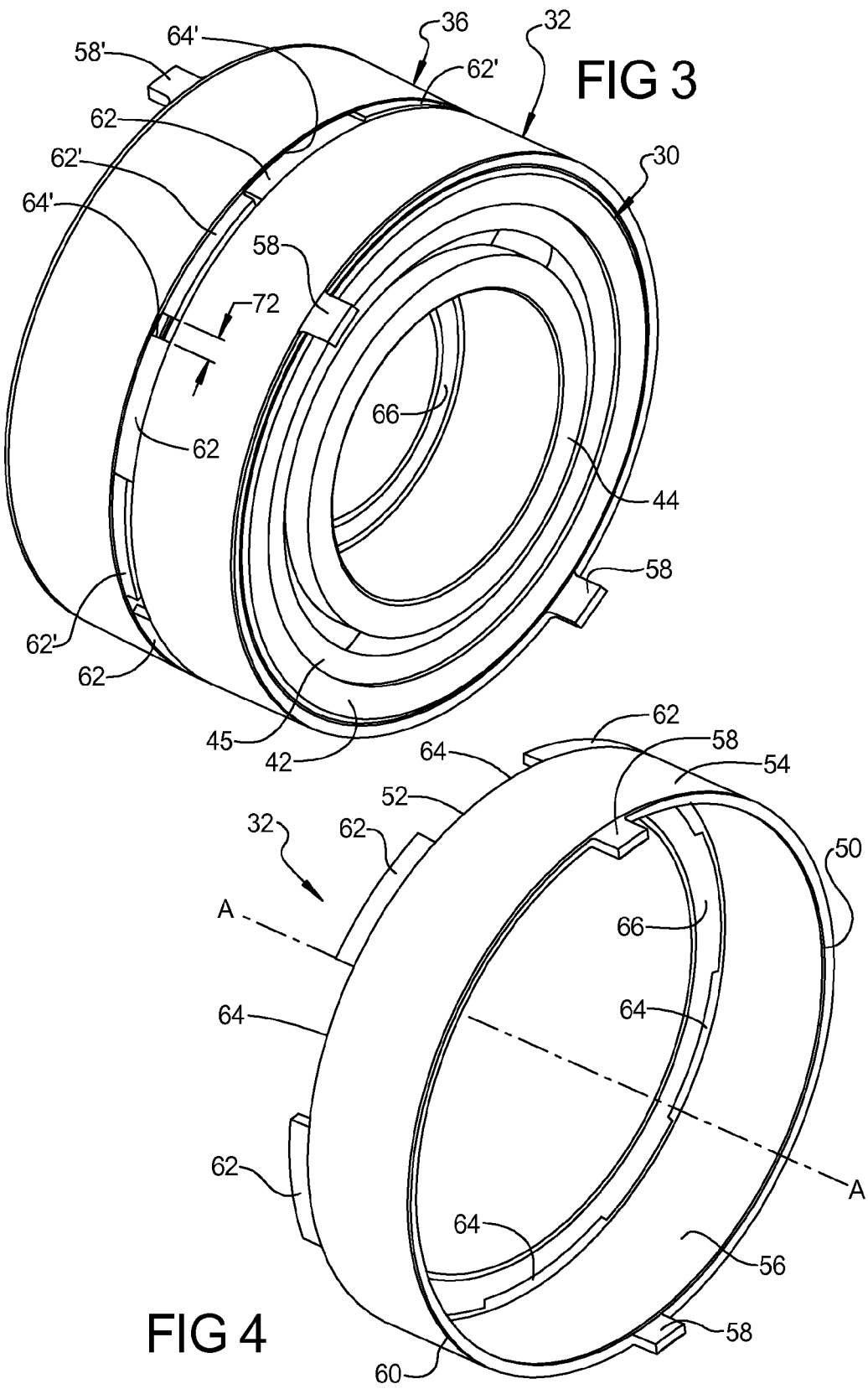

BEARING CUP ROTATIONAL LOCK ASSEMBLY

FIELD OF THE INVENTION

The present invention relates to bearing assemblies and more particularly to a bearing cup for a bearing assembly.

BACKGROUND OF THE INVENTION

Typically, rolling element bearings are used in rotating machinery designs (e.g. liquid rocket engine turbopumps) to provide radial and axial support of a rotating shaft assembly. These rolling element bearings are often a single ball bearing or a pair of preloaded angular contact ball bearings. The bearings are typically mounted to the rotating shaft and provide axial and radial positional control of the shaft.

One method of obtaining adequate radial and axial load carrying capabilities with some amount of damping is to use a combination of preloaded angular contact ball bearings and a hydrodynamic bearing. Yet many designs, including turbopumps for rocket engine applications, typically incorporate a balance piston to control the axial position of the shaft at various operating speeds. The balance piston utilizes the controlled pressures in a fluid flow circuit to provide axial thrust of the shaft while balancing the loads applied to the turbine. However, the angular contact ball bearings only control the axial position of the rotor during start-up and shut-down conditions. At operating speed, the axial position of the shaft is controlled by the balance piston, as noted above. The amount of axial movement of the shaft is considerable and the design requires that the outer race of the bearing assembly be slidably fitted in the bearing support housing.

A hydrodynamic bearing may center the shaft at operating speeds, potentially eliminating contact of the bearing outer race with the bearing support housing. In the absence of contact, the bearing outer race will spin and potentially gall as the race intermittently contacts the bearing housing. This spinning and galling of the bearing outer race can lead to part failure.

Accordingly, it would be highly desirable to provide a mechanism for preventing this failure by implementing a bearing cup rotational locking assembly that allows for significant shaft axial travel while preventing rotational movement of the outer race of the bearings.

SUMMARY OF THE INVENTION

A bearing cup apparatus for use with a bearing is provided. In one disclosed embodiment, the apparatus includes a ring and a shoulder extending radially inward from an inner surface of the ring. At least one tang extends axially outward from a first side of the ring. At least one tooth extends axially outward from a second side of the ring opposite the first side. At least one slot is formed in the second side. The apparatus prevents the outer race of a conventional rolling element bearing from rotating while allowing the bearing to move in an axial direction. The apparatus can be readily used with either a single rolling element bearing, a set of two bearing assemblies, or any number of closely spaced bearing assemblies. The advantage of the apparatus is that it eliminates spinning of the bearing assembly outer race. The apparatus also prevents frictional sliding between a bearing assembly outer race and a preload spring. Frictional sliding imposed on a bearing outer race can induce galling and subsequently lead to part failure.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a perspective view of the bearing cup rotational lock assembly;

FIG. 4 is a front perspective view of a bearing cup of the bearing cup rotational lock assembly constructed according to the principles of the present invention;

DETAILED DESCRIPTION OF THE PREFERRED EMBODIMENTS

The following description of the disclosed embodiment(s) is merely exemplary in nature and is in no way intended to limit the invention, its application, or uses.

Figure 1:
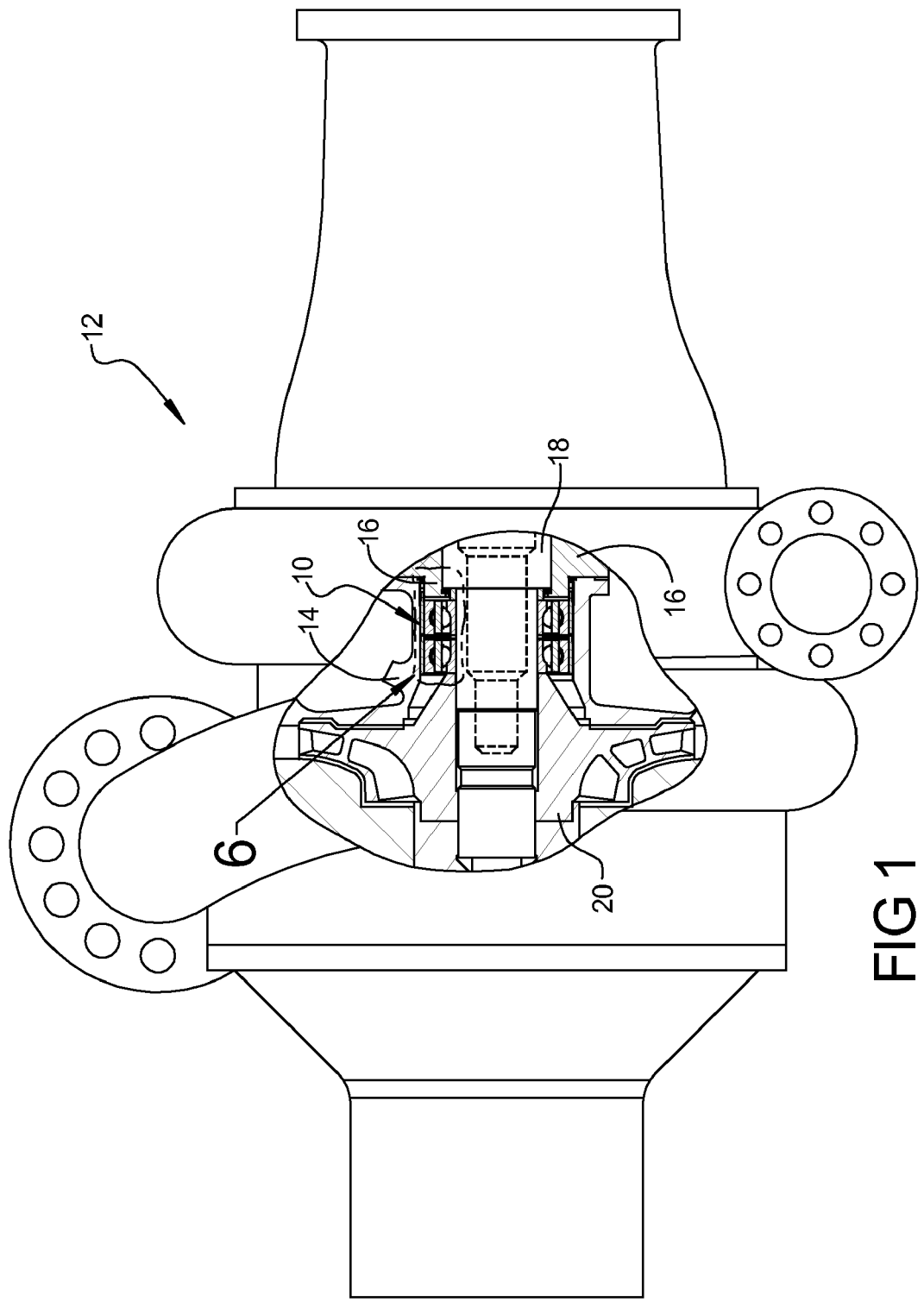
FIG. 1 is a partial cross sectional view of an exemplary turbopump having a bearing cup rotational lock assembly constructed according to the principles of the present invention

Referring to FIG. 1, a bearing cup rotational lock assembly (bearing assembly) 10 constructed according to the principles of the present invention is shown mounted in an exemplary turbopump 12. It is to be understood, however, that the bearing assembly 10 may be employed in numerous other mechanical devices having one or more bearings, including engines, turbines, or rotating shafts.

The turbopump 12 generally includes a housing 14, a damper seal 16, a shaft 18, and a rotating component 20. The bearing assembly 10 is mounted within the housing 14 and supports the shaft 18 for rotation. The damper seal 16 provides rotordynamic damping and radial support to the shaft 18. The rotating component 20 is mounted on the shaft 18

Figure 2:
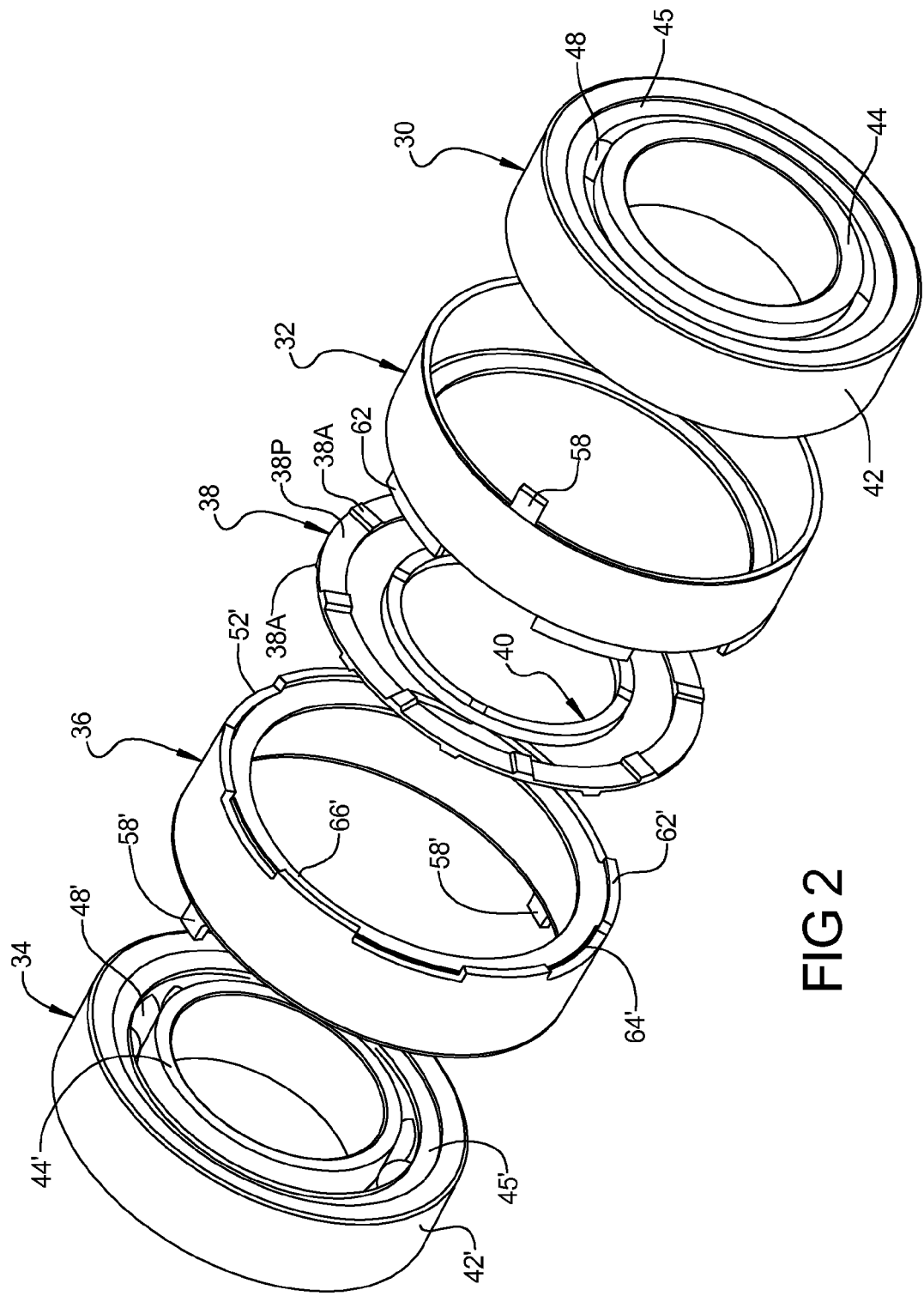
FIG. 2 is an exploded perspective view of the bearing cup rotational lock assembly.

Turning to FIGS. 2 and 3, the bearing assembly 10 is illustrated in greater detail. In one disclosed embodiment, the bearing assembly 10 includes a first bearing 30, a first bearing cup 32, a second bearing 34, a second bearing cup 36, a spring 38, and a shim 40. The first and second bearings 30, 34 and the first and second bearing cups 32, 36 are substantially identical. Accordingly, only the first bearing 30 and first bearing cup 32 will be described in detail, it being understood that the detailed description applies equally to the second bearing 34 and second bearing cup 36, respectively. In this regard, the various components of the second bearing 34 and second bearing cup 36 will be designated with the number of the component corresponding to the first bearing 30 and the first bearing cup 32 followed by a "'" symbol.

The first bearing 30 is illustrated as a preloaded angular contact ball bearing as is known in the art. However, various other rolling element bearing assemblies may be employed. The first bearing 30 includes an outer race 42, an inner race 44, a bearing cage 45, and a plurality of balls 48 (two of which are visible). The inner race 44 is rotatably supported by the plurality of balls 48 within the outer race 42. The outer and inner races 42, 44 are generally ring shaped.

Figure 5:
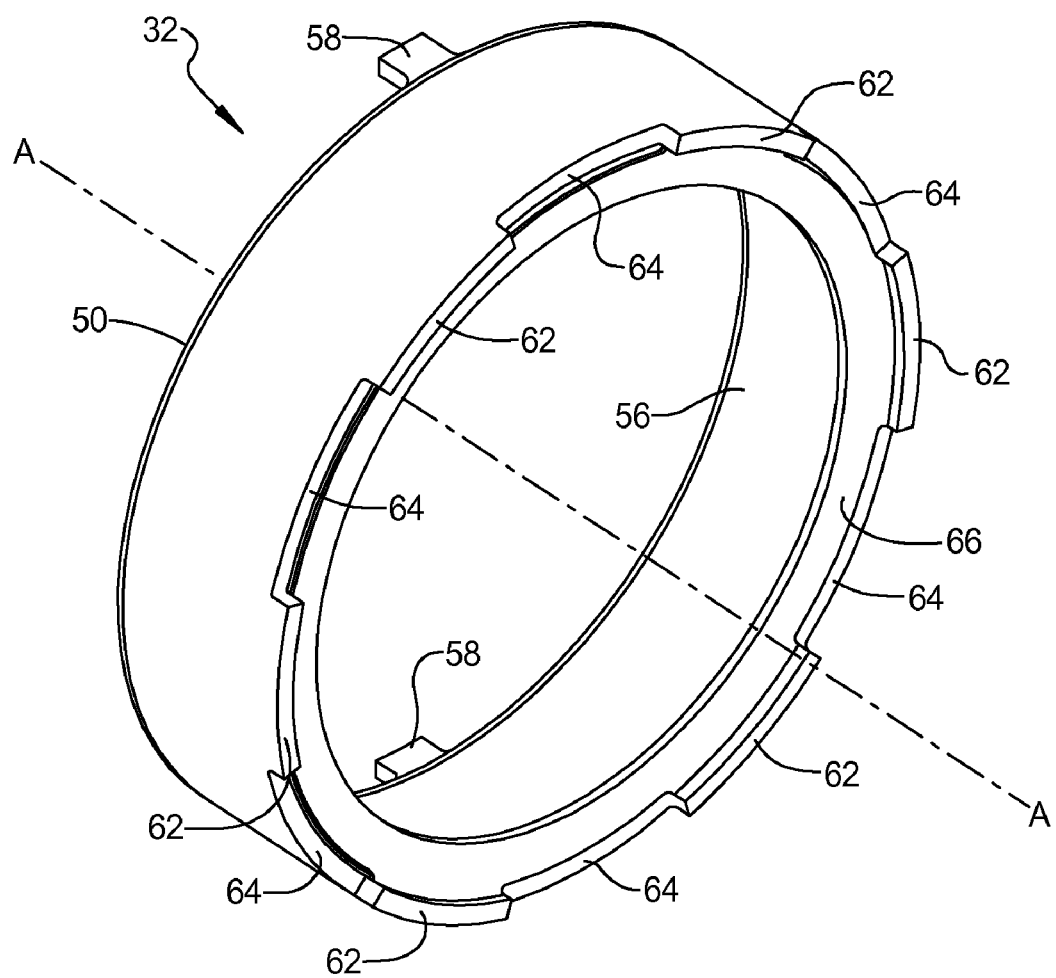
FIG. 5 is a back perspective view of the bearing cup of FIG. 4.

Referring now to FIG. 4, the first bearing cup 32 is generally ring shaped and defines an axis indicated by line A-A in FIGS. 4 and 5. The first bearing cup 32 includes a front side 50, a rear side 52, an outer surface 54, and an inner surface 56. A pair of tangs 58 extend out from the front side 50 in the direction of axis A-A. While only two tangs 58 are illustrated, it is to be understood that as many or as few as one tang may be employed. The tangs 58 fit within a portion of the housing 14 and prevent rotation of the first bearing 30 while allowing axial movement therein, as will be described in greater detail below. A chamfered edge 60 is formed along the front side 50 and transitions the front side 50 to the outer surface 54. The chamfered edge 60 aids in inserting the bearing cup 32 into the housing 14 during assembly of the bearing assembly 10. The chamfered edge 60 also prevents galling from axial travel during operation. A rounded edge could be substituted for the chamfered edge.

As best seen in FIG. 5, the first bearing cup 32 further includes a plurality of teeth 62 extending out from the rear side 52 in the direction of axis A-A. A plurality of slots 64 are formed between each of the plurality of teeth 62 on the rear side 52. The plurality of slots 64 are sized to receive the plurality of teeth 62 from the second bearing cup 36 as will be described in greater detail below. While in the particular example provided six teeth 62 and six slots 64 are illustrated, it is to be understood that any number of teeth and slots may be employed. Moreover, the first bearing cup 32 can be used singly by itself in which case no teeth or slots are required.

A shoulder 66 is formed on the inner surface 56 adjacent the rear side 52 and extends radially inward. The shoulder 66 is sized to accommodate the spring 38 as will be described below. Moreover, the bearing cup 32 can have lubricated surfaces to reduce sliding friction. The bearing cup surfaces in contact with the outer race 42 are not lubricated in the disclosed configuration.

The bearing cup 32 is sized to fit over the outer race 42 of the first bearing 30. The inner diameter of the inner surface 56 of the first bearing cup 32 is smaller than the outer diameter of the outer race 42 such that the bearing cup 32 is press fitted onto the bearing 30 thereby creating an interference fit between the two. In one disclosed embodiment, the bearing cup 32 is constructed from a high strength steel, although various other materials may be employed.

Returning to FIG. 2, in the particular example provided the spring 38 is a cylindrical beam spring having raised areas 38A upon a generally planar surface 38P. The raised areas 38A are located on opposite sides of the planar surface 38P at radial locations such that the raised areas 38A are not opposed and thereby generate a circumferential wave shape to the spring 38 when under an axial load. Compression of the spring 38 creates the circumferential wave shape and preloads the outer races 42 of the first and second bearings 30, 34 in the direction of axis A-A. Alternatively, other biasing members may be used for the spring 38.

Figure 6:
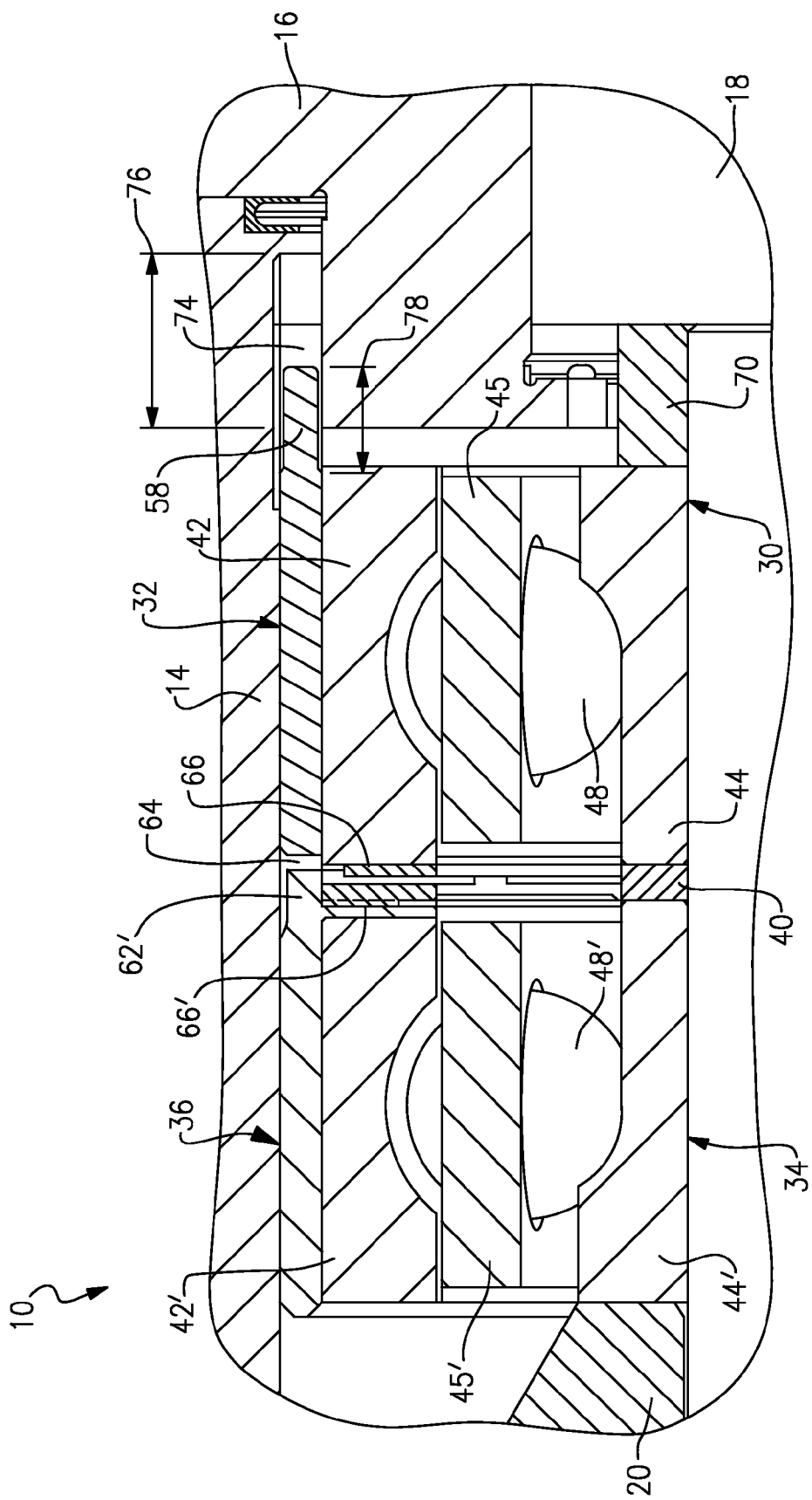
FIG. 6 is a cross sectional view of the bearing cup rotational lock assembly indicated by the box 6-6 shown in FIG. 1.

Turning now to FIG. 6, the interrelationship of the various components of the bearing assembly 10 will be described in greater detail. The first and second bearings 30, 34 are mounted onto the shaft 18 between the rotating component 20 and a shaft shim 70. The shaft 18 extends through the inner races 44, 44' of the first and second bearings 30, 34 and is supported for rotation therein. The inner races 44, 44' are rotatingly and axially fixed to the shaft 18. The first and second bearings 30, 34 are spaced apart from one another by the shim 40 mounted therebetween.

As noted above, the first and second bearing cups 32, 36 are press fitted onto the first and second bearings 30, 34, respectively. In this regard, the inner surfaces 56, 56' have an interference fit with the outer races 42, 42'. Preferably, the bearing cups 32, 36 are installed on the outer races 42, 42' by heating the bearing cups 32, 36 and chilling the outer races 42, 42' such that the bearing cups 32, 36 expand and the outer races 42, 42' contract. The interference fit that results is designed such that the load imparted on the outer races 42, 42' result in a negligible change in the size of the bearing raceway of the outer races 42, 42'. In addition, the press fit is sized such that the hoop stresses in the bearing cups 32, 36 remain within desired limits and a satisfactory amount of fit is maintained during all operating conditions. The first and second bearing cups 32, 36 are fixed to the first and second bearings 30, 34 such that the rear sides 52, 52' (FIGS. 2 and 4) of the first and second bearing cups 32, 36 face one another.

As best seen in FIG. 3, the first and second bearing cups 32, 36 engage one another. The teeth 62 of the first bearing cup 32 fit within the slots 64' of the second bearing cup 36 while the teeth 62' of the second bearing cup 36 fit within the slots 64 of the first bearing cup 32. In the disclosed embodiment, the slots 64, 64' are wider than the teeth 62, 62' thereby creating a gap, indicated by reference numeral 72. This allows the bearing cups 32, 36 to rotate slightly before locking each other from further rotation.

Returning to FIG. 6, it can be seen that there is a further gap in the axial direction between the teeth 62, 62' and the slots 64, 64' such that the bearing cups 32, 36 may move in the axial direction. The spring 38 is mounted between the first and second bearing cups 32, 36 and is enclosed by the teeth 62, 62', and by the shoulders 66, 66'. The shoulders 66, 66' in turn engage the outer races 42, 42' of the bearings 30, 34. The shoulders 66, 66' further act to ensure that a proper axial fit with the bearings 30, 34 is achieved when the bearing cups 32, 36 are mounted thereon.

After assembly, the spring 38 exerts a force in the direction of axis A-A and urges the outer races 42, 42' away from each other. This in turn urges the plurality of balls 48 against the inner races 44, 44' thereby preloading the bearings 30, 34. In addition, the shoulders 66, 66' prevent frictional sliding between the spring 38 and the outer races 42, 42'.

Pockets 74 (one of which is shown) are formed within the housing 14 for receiving the tangs 58 of the first bearing cup 32. In the particular example provided, the pockets 74 are illustrated as being formed in part by the housing 14 and the damper seal 16. However, the pockets 74 may alternatively be formed entirely by the housing 14 (not shown) or entirely by the damper seal 16 (not shown). The pockets 74 have a depth, indicated by reference numeral 76, that is greater than the length of the tangs 58, indicated by reference numeral 78. In this way, movement of the bearing assembly 10 in the direction of axis A-A will never lead to the tangs 58 from escaping the pockets 74 or the tangs 58 from bottoming in the pockets 74. In addition, the width and thickness of the tangs 58 are designed such that the stresses induced in the tangs 58 are within desired limits for all loading conditions.

The bearing cups 32, 36 can significantly extend the operational life of a turbopump 12. At the start of an engine (not shown), the preloaded bearing assembly 10 will provide radial support to the shaft 18. As the engine (not shown) transitions to operating speeds, a balance piston (not shown) will control the position of the shaft 18 in the direction of axis A-A and the bearing assembly 10 will slide to accommodate the change in axial position. The radial loads between the housing 14 and the bearing assembly 10 may be completely eliminated. In the event that environmentally induced torque on the outer races 42, 42' is greater than resisting frictional load between the bearing cups 32, 36 and the housing 14, the bearing cup tangs 58 will prevent rotational movement of the outer races 42, 42'. The bearing cups 32, 36 will also eliminate potential galling of the outer races 42, 42' due to the required axial movement of the shaft 18 and due to sliding friction between the spring 38 and the outer races 42, 42'.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A bearing assembly comprising:
    a first bearing having an inner race and an outer race; and
    a plurality of rolling elements disposed between said inner race and said outer race;
    a first bearing cup disposed at least partially around the first bearing and secured to the outer race thereof, the first bearing cup having at least one tang adapted to interface with a portion of an apparatus to prevent the first bearing cup from rotating while allowing the first bearing cup with the first bearing to move in an axial direction;
    a second bearing having an inner and a outer race;
    a second bearing cup disposed at least partially around the second bearing and secured to the outer race thereof, the second bearing cup engaged with the first bearing cup such that a predetermined rotational movement is permitted between the second bearing cup and the first bearing cup; and
    a generally flat spring in contact with both said first bearing cup and said second bearing cup to form said generally flat spring into a circumferential wave shape.

2. The bearing assembly of claim 1, wherein the bearing cups each include at least one tooth and at least one slot, the tooth of the bearing cup disposed within the slot of the second bearing cup and the tooth of the second bearing cup disposed within the slot of the first bearing cup.

3. The bearing assembly of claim 2, wherein the at least one tooth of the first bearing cup moves a predetermined distance in a circumferential directional in the at least one slot of the second bearing cup and the at least one tooth of the second bearing cup move a predetermined distance in the circumferential direction in the at least one slot of the first bearing cup.

4. The bearing assembly of claim 3, wherein the bearing cups are generally ring shaped, the first bearing cup having a first shoulder which abut the first outer race, and the second bearing cup having a second shoulder which abuts the second outer race.

5. The bearing assembly of claim 1, wherein the bearing cups each include a plurality of teeth disposed within a plurality of slots to form an interlocking mesh, and wherein the generally flat spring is protected between the shoulders and the interlocking teeth of the bearing cups.

6. The bearing assembly of claim 5, further comprising a shim disposed between the inner races of the bearings to space the bearings apart from one another.

7. The bearing assembly of 1, wherein the first and second bearing cups are secured to the respective first and second outer races through an interference fit.

8. The bearing assembly as recited in claim 1, wherein said circumferential wave shape generates an axial preload to both said first bearing cup and said second bearing cup.

9. The bearing assembly as recited in claim 8, wherein said axial preload to both said first bearing cup and said second bearing cup axially preloads said first bearing relative to said second bearing.

10. The bearing assembly as recited in claim 1, wherein said axial preload remains generally constant irrespective of movement of said first bearing and said second bearing.

11. The bearing assembly as recited in claim 10, wherein said first bearing cup and said second bearing cup carry radial loads and permit axial shaft travel of a shaft supported by said first bearing and said second bearing.

12. The bearing assembly of claim 1, wherein said generally flat spring includes raised areas on opposite sides of a flat surface, the raised areas distributed at circumferential locations such that the raised areas are circumferentially offset.

13. The bearing assembly of claim 12, wherein each said raised areas extend from the flat surface to define a thickness greater than said flat surface at a radial location defined in part by said flat surface.

14. A bearing assembly comprising:
    a first inner race defined about an axis;
    a first outer race defined about the axis;
    a plurality of first rolling elements disposed between said first inner and outer races;
    a first bearing cup mounted at least partially about the first outer race and having a tang projecting therefrom adapted to interface with a structure in which said bearing assembly is located to prevent the first bearing cup from rotating while allowing the first bearing cup to move in an axial direction along a longitudinal axis of the bearing assembly;
    a second inner race defined about the axis;
    a second outer race defined about the axis;
    a plurality of second rolling elements disposed between the second inner race and outer secondary races,
    a second bearing cup mounted at least partially about the second outer race and engaged with the first bearing cup such that a predetermined rotational movement is permitted between the second bearing cup and the first bearing cup; and
    a generally flat spring in contact with both said first bearing cup and said second bearing cup to form said generally flat spring into a circumferential wave shape to axially preload said first bearing cup relative said second bearing cup.

15. The bearing assembly of claim 14, wherein the first bearing cup includes a multiple of slots and said second bearing cup includes a multiple of teeth, each of the plurality of slots are larger than each of the plurality of teeth to enable the teeth to move within the slots to provide the predetermined rotational movement.

16. The bearing assembly of claim 14, wherein the first and secondary rolling elements comprise balls.

17. The bearing assembly of claim 14, wherein said generally flat spring includes raised areas on opposite sides of a flat surface, the raised areas distributed at circumferential locations such that the raised areas are circumferentially offset.

18. The bearing assembly of claim 17, wherein each said raised areas extend from the flat surface to define a thickness greater than said flat surface at a radial location defined in part by said flat surface.

19. The bearing assembly as recited in claim 14, wherein said first bearing cup and said second bearing cup carry radial loads and permit axial shaft travel of a shaft.

20. The bearing assembly as recited in claim 19, wherein said axial preload remains generally constant irrespective of movement of said first bearing and said second bearing.

21. The bearing assembly as recited in claim 14, wherein said first bearing cup, said second bearing cup and said generally flat spring do not limit axial shaft travel of a shaft.

22. A bearing assembly comprising:
a first inner race;
a first outer race;
a first plurality of rolling elements disposed between the first inner and outer races;
a first bearing cup mounted at least partially about the first outer race, the first bearing cup including a plurality of first teeth;
a second inner race;
a second outer race;
a second plurality of rolling elements disposed between the second inner and outer races;
a second bearing cup mounted at least partially about the second outer race, the second bearing cup including a plurality of second teeth, said plurality of first teeth engaged with said plurality of second teeth; and
a generally flat spring in contact with both said first bearing cup and said second bearing cup to form said generally flat spring into a circumferential wave shape to axially preload said first bearing cup relative said second bearing cup.

23. The bearing assembly of claim 22, wherein said generally flat spring is disposed axially between said first outer race and said second outer race for biasing said rolling elements against said first and second inner races, and thus providing a pre-load force to said rolling elements.

24. The bearing assembly of claim 22, wherein said first bearing cup includes a plurality of circumferentially arranged slots around a perimeter portion thereof for engaging with the plurality of second teeth of said second bearing cup, said second bearing cup includes a plurality of circumferentially arranged slots around a perimeter portion thereof for engaging with the plurality of first teeth of said first bearing cup.

25. The bearing assembly as recited in claim 22, wherein said axially preload of said first bearing cup relative said second bearing cup axially preloads said first bearing and said second bearing.

26. The bearing assembly as recited in claim 22, wherein said axially preload of said first bearing cup relative said second bearing cup axially preloads said first outer race relative to said second outer race.

27. The bearing assembly of claim 22, wherein said generally flat spring includes raised areas on opposite sides of a flat surface, the raised areas distributed at circumferential locations such that the raised areas are circumferentially offset.

28. The bearing assembly of claim 27, wherein each said raised areas extend from the flat surface to define a thickness greater than said flat surface at a radial location defined in part by said flat surface.

* * * * *

UNITED STATES PATENT AND TRADEMARK OFFICE
CERTIFICATE OF CORRECTION

PATENT NO. : 7,594,760 B2  
APPLICATION NO. : 10/662751  
DATED : September 29, 2009  
INVENTOR(S) : Goss et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 613 days.

Signed and Sealed this

Twenty-eighth Day of September, 2010

David J. Kappos  
*Director of the United States Patent and Trademark Office*